United States Patent [19]

DiBianca

[11] Patent Number: 4,879,469
[45] Date of Patent: Nov. 7, 1989

[54] MIXED MEDIA FOR KINESTATIC CHARGE DETECTORS

[75] Inventor: Frank A. DiBianca, Chapel Hill, N.C.

[73] Assignee: University of North Carolina, Chapel Hill, N.C.

[21] Appl. No.: 193,527

[22] Filed: May 13, 1988

[51] Int. Cl.$^4$ .............................................. G01T 1/185
[52] U.S. Cl. ................................. 250/374; 250/385.1; 252/372
[58] Field of Search ............................. 250/385.1, 374; 252/372

[56] References Cited

U.S. PATENT DOCUMENTS

| | | | |
|---|---|---|---|
| 2,714,682 | 8/1955 | Meister et al. | 313/485 |
| 2,714,684 | 8/1955 | Meister et al. | 313/112 |
| 2,714,685 | 8/1955 | Meister et al. | 313/572 |
| 4,071,763 | 1/1978 | Peschmann | 250/374 |
| 4,453,107 | 6/1984 | Keenan | 313/579 |
| 4,645,934 | 2/1987 | Allemand et al. | 250/374 |
| 4,707,608 | 11/1987 | DiBianca | 250/389 |
| 4,733,085 | 3/1988 | Anderson | 250/374 |

Primary Examiner—Constantine Hannaher
Attorney, Agent, or Firm—Cushman, Darby & Cushman

[57] ABSTRACT

A detection medium for a kinestatic charge detector is a mixture of gases, typically including at least one noble gas such as zenon or krypton. The medium can be pressurized to improve resolution and temperature can also be applied to the medium for improving resolution. Various additive or dopant gases can also be introduced to improve resolution.

17 Claims, 3 Drawing Sheets

MIXED MEDIA FOR KINESTATIC CHARGE DETECTORS

FIELD OF THE INVENTION

The invention is directed to the medium to be employed in a kinestatic charge detector (KCD) of the type disclosed in allowed U.S. Pat. No. 4,707,608 which is incorporated herein by reference. More particularly, the invention includes the use of various binary, ternary or more complicated mixtures (solutions) in KCDs.

BACKGROUND OF THE INVENTION

The first successful experiments which demonstrated the KCD invention were made using highly purified (research grade) xenon at approximately 25 atmospheres pressure. Some of the advantages of using xenon are:

1. Xenon has the highest atomic number of the available noble gases. This yields the highest x-ray attenuation coefficient at diagnostic x-ray energies and the highest photoelectric interaction probability.
2. Xenon has a low mobility for its ions which means higher electric fields must be used for a given kinestatic velocity. This reduces the relative field distortions caused by the space charge of the ions produced during the detection of the x-ray beam.
3. Several other advantages exist for a xenon detection medium it has a relatively low W-value (average energy to produce an ion pair), it is a monatomic molecule (polyatomic media are slowly consumed during irradiation) and it has a high dielectric constant.

However, xenon also possesses disadvantages when used in a KCD including:

1. A high fluorescent yield (0.85) and a relatively high K-fluorescence energy (30 keV) which produces a scatter "halo" around the point spread function and a reduced spatial resolution.
2. A further reduced resolution in the scanning direction caused by the generation of multiple positive ionic species not in chemical equilibrium and having disparate mobilities.

The second disadvantage was discovered from the increasing width of the point spread function for a pulsed x-ray beam from a slit, as a slit was moved away from the signal collection region. Other possible sources of the effect such as ionic diffusion, space charge, grid shielding inefficiency and electric field nonuniformity cannot adequately explain the observations.

SUMMARY OF THE INVENTION

One solution to the first disadvantage is to *increase* the density (pressure) of the xenon so as to compress the halo to a point where it is unobjectionable. This method has the problem of also reducing the mean free path of the incident primary radiation causing an increase in recombination, space-charge, and effects from front window field nonuniformities, but it can be useful. The ratio of mean free paths at a typical mean primary energy of about 75 keV to that at the K-fluorescence energy (30 keV) is about 2.0. Thus, to reduce the scatter length to about 2 mm using a pressure of about 50-60 atm results in a primary penetration distance of about 4 mm.

A second solution is to *reduce* the density (pressure) so that the K-fluorescence has an increased probability to exit the chamber before interacting again. Pressure as low as 10 atm could accomplish this. Disadvantages with this method are a reduced primary detection efficiency (unless the chamber is inordinately deep) and an increased electron range causing a poorer spatial resolution.

A third solution involves adding a gas with an appreciably higher atomic number and therefore both a reduced K-shell excitation probability and higher transparency to the new K-fluorescent radiation. One such candidate gas is tungsten hexafluoride ($WF_6$). Pure $WF_6$ has a relatively low liquification pressure of about 1.7 atm at 20° C. Dissolving it in xenon might allow a significantly increased concentration of $WF_6$ to be provided.

A further possibility would be to increase the temperature of the detector to about 60°-70° C. at which temperature the liquification pressure rises to 5-10 atm.

A better solution to the problem of K-scatter is the addition of a second gas having a significantly lower atomic number such as krypton or argon. Both the K-fluorescent yield and the K-fluorescence energy of krypton and argon are significantly lower than those of xenon. Thus, the amount of energy deposited in, and the size of the scatter halo are greatly reduced. Furthermore, krypton is a slightly better absorber at equal pressure (less than about 40 atm) of xenon K-scatter than xenon itself is. Therefore, xeno-krypton mixtures will have significantly reduced K-scatter halo compared with pure xenon.

At 50 atm pressure the mean free path of xenon's K-fluorescence in the Xe-Kr solutions is approximately 3 mm, independent of the Kr mole fraction. Thus, the pressure could be chosen so as to specify the Xe K-scatter distance and one can independently choose the mole fraction to specify the primary interaction length. Furthermore, as the mole fraction of Kr increases, the amount of halo decreases since more interactions occur on the Kr atoms. Xenon-argon or krypton-argon mixtures have the advantage that the argon can reduce the electron range in the mixture (increasing spatial resolution) while allowing the K-fluorescence to escape the detector (reducing halo).

Other candidates containing atoms with atomic numbers in the 30-40 range exist such as HBr. The usefulness of these candidates may depend to a large extent on the mobilities of the ionic species produced and on their electron attachment coefficients. It is best to avoid appreciable electron attachment coefficient, since ion-ion recombination is larger than electron-ion recombination.

The second disadvantage, i.e., that of mobility dispersion, is much more difficult to analyze and overcome. This problem will be discussed from two hypothetical viewpoints (one of which must be correct).

The first hypothesis is that the rare gas can be considered to be pure. By this we mean that the observed mobility dispersion is in no way related to the presence of any contaminants in the gas. Then, the hypothetical ionic charge carriers with different mobilities must be the polyatomic ions $Xe_n^+$ at least some of which must have n greater than one. It is known that the $Xe^+$ and $Xe^{++}$ which are originally formed can quickly convert to $Xe_2^+$, $Xe_3^+$, etc. via three-body reactions which are prevalent at the high pressures used. Moreover, at sufficiently high pressures and limited temperatures, n can reach values of several hundred to several thousand corresponding to the formation of cluster ions. However, since the reaction times corresponding to the formation of these polyatomic ions are on the order of picoseconds to nanoseconds, whereas the minimum resolution time of a KCD is about 100 microseconds ($10^5$ to $10^8$ times slower), it is not clear how such states can lead to the observed mobility dispersion. In other words, one expects all the ions to appear to move at the *average* mobility of all these states. There appear to be only two ways around this argument: (1) the mobility dispersion is caused by statistical fluctuations about the mean mobility or (2) some unknown states with different mobilities are forming with lifetimes on the order of 100 microseconds or longer.

The alternative hypothesis is that the gas contains one or more contaminants (impurities) which are responsible for the observed mobility dispersion. For this to happen, it would appear that the ionic charge carriers would have to contain one or more impurity molecules (or their dissociation products). Denoting the impurities by I, the charge carriers then fall into two classes: $I_n + Xe_m$ or $Xe_n + I_n$, where $n(n') \geq 1$ and $m \geq 0$. In other words the charge carrying molecules must contain one or more impurity components and zero or more xenon components and the charge may reside on either component.

Now, if the ionization potentials of all the I molecules are greater than those of all the Xe states, one would expect the charge carriers to fall into the second class above (i.e., no charge transfer). However, if some of the impurities have ionization potentials lower then those of the Xe states, the charge will be transferred from Xe to those impurity molecules during collisions between the two.

This hypothesis provides a more plausible explanation of the observed mobility dispersion, since even if the reaction rate of coefficients of the formation of such impurity-containing charge carriers are comparable to those of the pure Xe case, the actual reaction rates could be comparable to the resolution time of a KCD if the impurity concentrations were low enough (but not too low). One would expect problems if the offending impurity concentrations were somewhere on the order of $10^{-8}$ to $10^{-5}$ (using the numbers from the first hypothesis), i.e., 10 parts per billion to 10 parts per million. Such impurity concentrations are easily expected even in the highest purity gases commercially available and would be produced in the detector by outgassing effects in any case.

Fortunately, however, this second, more plausible hypothesis suggest two possible solutions to the mobility dispersion problem. The first, more difficult, solution would be to eliminate the offending impurities from the detector. This would necessitate obtaining noble gases with impurities of less than a few PPM and possibly even a few PPB and ensuring that detector outgassing were kept low enough to maintain such high purities. This would probably require either a continuously circulating purification scheme, a not very palatable solution for practical applications, or a system for continuously or periodically bleeding out the detector gas and replenishing it with pure gas, a more practical but still less than optimum solution.

A second, much easier solution to implement, is the introduction of a suitable dopant gas into the main gas for the purpose of transferring all the ionic charges to the dopant in a more controlled manner. This would be expected to reduce the mobility dispersion. A dopant whose ionization potential is very low would act as a charge "sink" and would quickly acquire all the ionic charge in the gas.

DETAILED DESCRIPTION OF THE INVENTION

Figure 1:
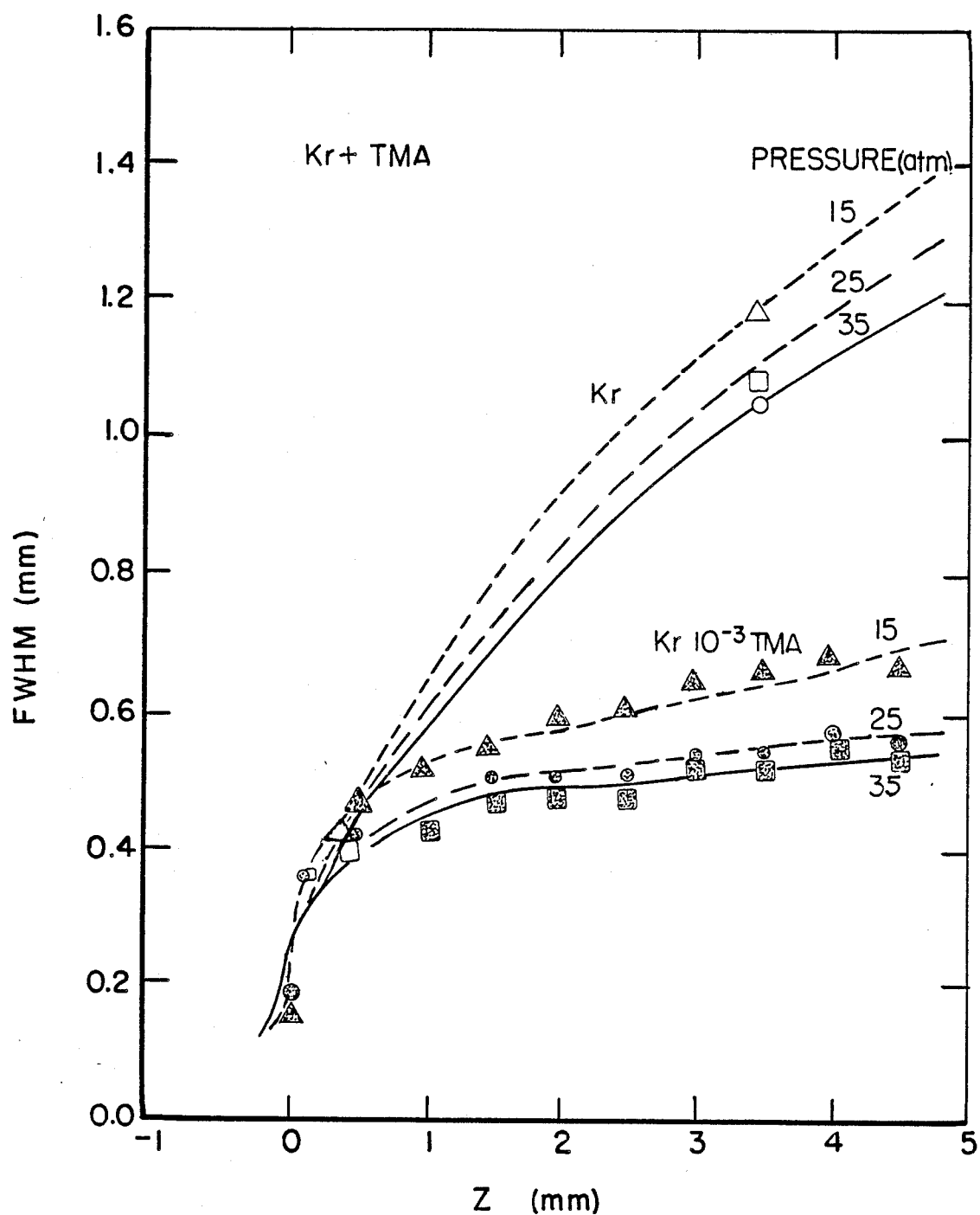
FIG. 1 graphically illustrates the effects of the addition of TMA to Krypton, at several pressures.

Even without knowing the detailed mechanisms in operation, however, several methods of solution are now disclosed. These methods may be used individually or jointly to further increase their effects.

1. Pressure variation. By significantly increasing or decreasing the pressure, it is possible to increase or reduce, respectively, the reaction rates responsible for the production of the secondary ionic species. In either case this can improve the spatial resolution by either reducing or more completely forming the secondary species. That is, it is desirable to avoid the situation where substantial conversion to secondary species is occurring during the ionic drift across the chamber. Thus, it is advantageous either to reduce the production of secondary species or to form them very quickly (i.e., during a time period small compared with the ion drift times of typically several msec).

Since the rates of three-body reactions vary with the squares of the molecular densities, changing pressure can be a very effective way to control the formation of secondary ionic species.

2. Temperature variation. Since temperature is another factor which determines chemical reaction rates, varying the detector temperature provides another means to control the production of secondary ionic species.

3. Addition of dopants. There exist a host of potential dopant gases which can be introduced to overcome the above described disadvantages. Before discussing particular candidates, it will be useful to describe the general parameters of importance.

i. Electron Attachment Coefficient. Some gases exhibit no or little tendency to attach free electrons, especially at the low ratios of E-field to molecular number density (E/n) typically used in KCDs. Examples are the noble gases (He, Ne, A, Kr, Xe), $H_2$, $N_2$, $CO_2$, Co, $NH_3$, $BH_3$, $H_2S$, and the hydrocarbon gases ($CH_4$, $C_2H_2$, $C_2H_6$, $C_3H_8$, etc.).

Other gases readily attach electrons. Some examples are $O_2$, $Cl_2$, $SF_6$, $WF_6$, $BF_3$, $SO_2$, $NO_2$.

As stated above, it is better to avoid gases which readily attach electrons, because the recombination coefficients for ion-ion recombination are much higher than for electron-ion recombination.

ii. Ionization Energy. This is the amount of energy needed to remove an electron from a monatomic or polyatomic molecule. Thus the ionization energy of $Xe_2$, $Kr_2$, $H_2$, and $(CH_3)_3N$ are 12.13, 14.00, 15,43, 7.82 eV, respectively. Reactions cannot proceed unless sufficient total energy is available. Thus, the reaction $$Kr^+ + Xe \rightarrow Kr + Xe^+ + 1.89 \text{ eV}$$

will occur rapidly if sufficient concentration of both reactants are present, but the converse reaction cannot occur (unless the energy deficit is supplied externally). Since the thermal energy of gas molecules at room temperature is on the order of a few tens of millielectron volts (k=0.00008625 eV/°K.), such reverse reactions cannot proceed spontaneously.

It should be possible to make use of one or more ionization reactions to shift the charge to one or more ionic species with similar mobilities and thus sharpen the drift point-spread function and thereby the spatial resolution of a KCD.

iii. Dissociation Energy and Products. This is the energy to dissociate a molecule or polyatomic ion. To dissociate a hydrogen molecule requires an energy E given by $$H_2 + E \rightarrow H + H.$$

Molecular dissociation may be important in KCDs for several reasons. First, if polyatomic gases are used as main constituents or as dopants, it is important to know what ion products are formed under x-irradiation and under the primary electron excitation or ionization. This is because of their potentially disparate mobilities and also because the radicals thus formed could corrode the internal surfaces of the KCD unless special precautions are taken.

Secondly, one may wish to make use of known charge exchange reactions to produce stable polyatomic ions or, conversely, to initiate a known dissociation reaction.

iv. Electric Dipole Moment. Certain nonsymmetric molecules possess an electric dipole moment and are called "polar" molecules. Thus, they appear to have centers of positive and negative charge which are displaced from each other. Symmetrical molecules possess no dipole moment and are called "nonpolar" molecules. The polar molecules CO, $H_2O$, $SO_2$, and $NH_3$ have dipole moments of 0.112, 1.85, 1.63, and 1.47 debyes. Examples of nonpolar (symmetrical) molecules are those with two or fewer atoms which are composed entirely of one element, and $BF_3$, $SO_3$, $SF_6$, $CH_4$, $C_2H_2$, and $C_2H_6$.

Molecules with dipole moments are more strongly attracted by the nonuniform electric fields of ions (point charges) of either sign, although the effect tends to be diminished by the rapid rotation of the dipole. Nonpolar molecules may be weakly attracted by ions since the nonuniform field can induce a weaker, nonpermanent dipole moment.

The electrostatic attraction of polar molecules to ions can be used to stabilize the mobilities of different ionic species as is explained later.

We now discuss in more detail how dopant gases may be used to stabilize the mobility of the ions of a KCD. We remember the earlier statement that the means given here may be used in various combinations. To list all permutations of i. through iv. above would be inconvenient.

One method involves introducing a non-electron-attaching dopant in concentration of up to several percent which quickly becomes ionized by charge transfer reactions from the noble gas ions but then either undergoes no further reactions, or does so with the production of further species having similar mobilities to the parent ion. Examples of such non-electron-attaching gases with ionization potentials less then that of Xe (12.13 eV) are $BH_3$ (11.3 eV), $NH_3$ (10.2), $C_2H_2$ (11.4) and many others. However, to be most useful, the dopant's ionization potential should not only be less than the main noble gas used, it should also be lower than those of any impurities present.

Figure 2:
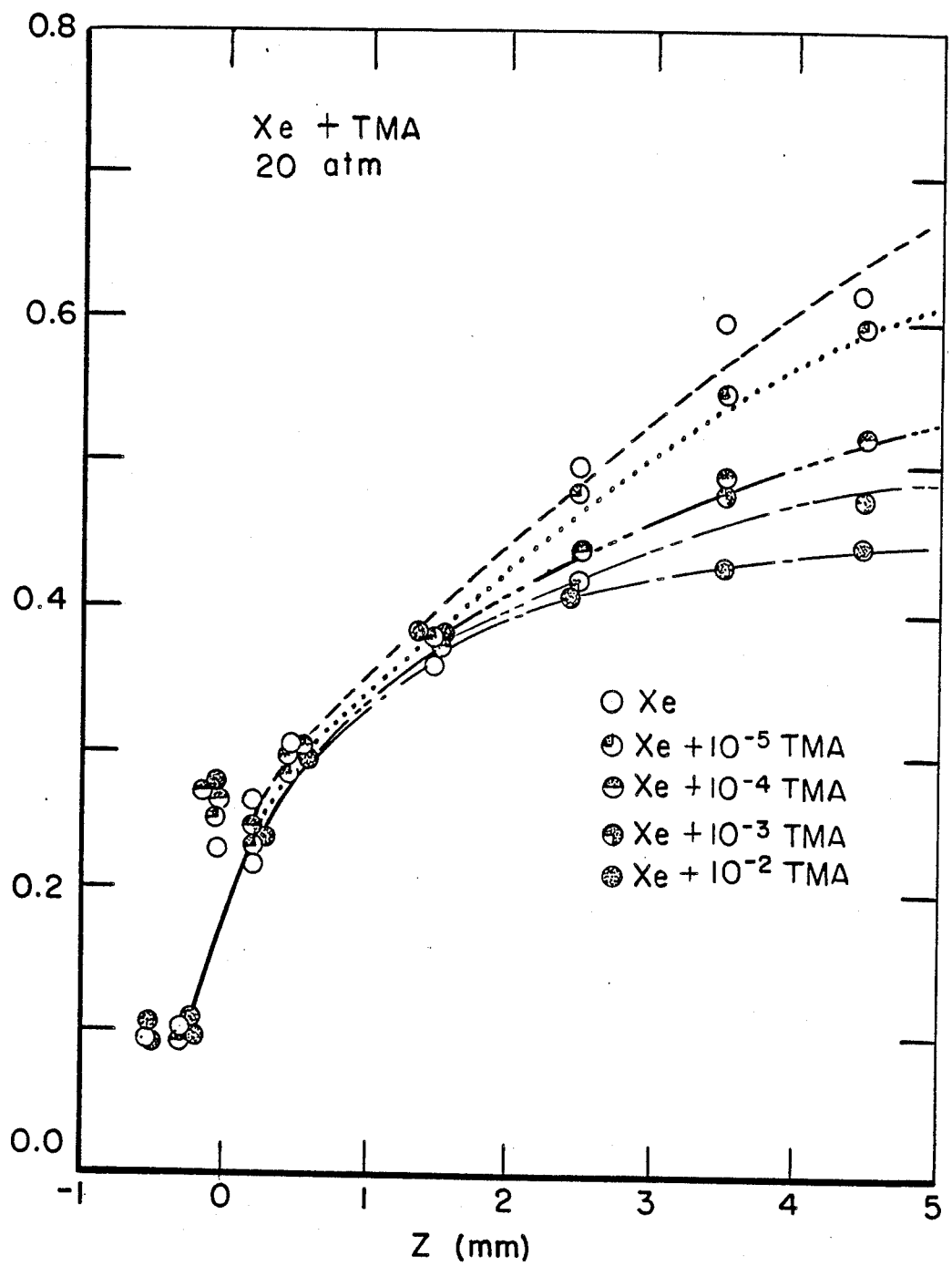
FIG. 2 graphically illustrates the effects of the addition of TMA, in several concentrations, to Xenon.
Figure 3:
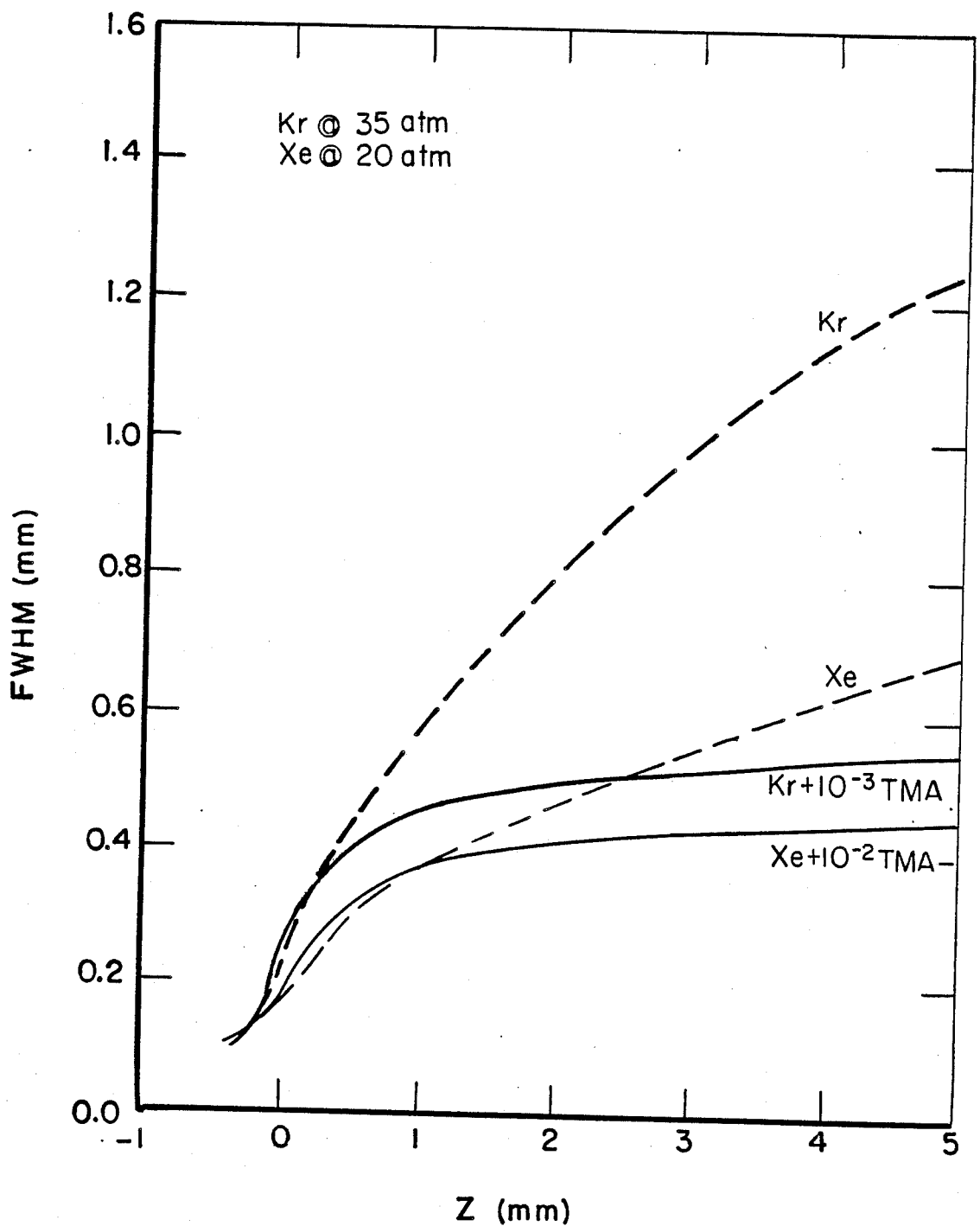
FIG. 3 graphically illustrates the overall effect of TMA addition to Xenon and Krypton.

Experiments have been conducted which led to the discovery that the introduction of the gas trimethylamine (TMA), which has a very low ionization potential (7.8 eV), produces a dramatic reduction in the blurring of the spatial resolution. As shown in FIG. 1, the point spread function of krypton with the addition of $10^{-3}$ mole fraction of TMA is reduced at several pressures. FIG. 2 shows the results of adding up to $10^{-2}$ mole fraction of TMA to Xenon gas. FIG. 3 reflects the overall effect of adding TMA to both Xenon and Krypton.

It is also possible to introduce an efficient electron-attaching gas such as $SF_6$ and to collect negative ions. It appears that the mobilities of some of the principal ions produced have similar mobilities: $SF_6^-$ (0.542 cm$^2$/Vs), $SF_5^-$ (0.595 cm$^2$/VS). Of course, one then has the limitation of increased recombination.

Another approach is to add, in concentrations of up to several percent, polar gases which cluster strongly around the ions. There is experimental evidence that some families of clustered ions have much more similar mobilities than the bare ions. For example the unclustered alkali ions $Li^+$ . . . through $CS^+$ in Xe at one atm have mobilities which vary by a factor of about 3.13, while the water-clustered versions of the same ions have mobilities which only vary by a factor of 1.18 (see Loeb, "Basic Processes of Gaseous Electronics", 1955). This, despite the mass ratio of 19.1 of the bare ions.

Other variations are clearly possible including the addition of multiple dopants to single or multiple parent gas solutions.

It should be appreciated that the above described description of the preferred embodiments do not limit the scope of the invention in any way.

What is claimed:

1. A detection medium for use in a kinestatic charge detector, said medium comprising a mixture of xenon gas and one or more gases containing molecules composed on one or more atomic constituents, wherein at least one of said gases has a higher atomic number than said xenon gas.

2. A medium as set forth in claim 1, wherein said mixture includes tungsten hexafluoride gas.

3. A kinestatic charge detector comprising a detection medium, said medium comprising a mixture of xenon gas and one or more gases containing molecules composed of one or more atomic constituents, at least one of said gases having a lower atomic number than said xenon gas.

4. A medium as set forth in claim 3, wherein said mixture with xenon gas includes krypton gas.

5. A medium as set forth in claim 3, wherein said mixture with xenon gas includes HBr gas.

6. A kinestatic charge detector comprising a detection medium, said medium comprising a mixture of at least two of the noble gases xenon, krypton and argon.

7. A kinestatic charge detector comprising a detection medium, said medium comprising a mixture of xenon gas and trimethylamine (TMA).

8. A medium as set forth in claim 7, wherein said mixture comprises $10^{-5}$ mole fraction of said TMA.

9. A medium as set forth in claim 7, wherein said mixture comprises $10^{-4}$ mole fraction of said TMA.

10. A medium as set forth in claim 7, wherein said mixture comprises $10^{-3}$ mole fraction of said TMA.

11. A medium as set forth in claim 7, wherein said mixture comprises $10^{-2}$ mole fraction of said TMA.

12. A kinestatic charge detector comprising a detection medium, said medium comprising a mixture of krypton gas and trimethylamine (TMA).

13. A medium as set forth in claim 12, wherein said mixture comprises a pressure of 15 atmospheres.

14. A medium as set forth in claim 12, wherein said mixture comprises a pressure of 25 atmospheres.

15. A medium as set forth in claim 12, wherein said mixture comprises a pressure of 35 atmosphere.

16. A medium as set forth in claim 12, wherein said mixture comprises $10^{-3}$ mole fraction of said TMA.

17. A kinestatic charge detector comprising a detection medium, said medium comprising a mixture of low ionization potential dopant gases, said mixture comprising at least one of the xenon, krypton and argon gases.

* * * * *